Feb. 13 1951          L. J. KOCH          2,541,424
LINK FRICTION PIN PLIERS
Filed March 4, 1949

Inventor
Leo J. Koch
By Arthur H. Sturges
Attorney

Patented Feb. 13, 1951

2,541,424

UNITED STATES PATENT OFFICE 2,541,424

LINK FRICTION PIN PLIERS

Leo J. Koch, Fleming, Colo.

Application March 4, 1949, Serial No. 79,574

1 Claim. (Cl. 29—268)

This invention relates to automobile accessories and more particularly it is an object of the invention to provide a plier-type tool for removing the link friction pin from the brake band of an automobile.

A further object of this invention is to provide a tool as described which is adjustable for working with link friction pins of various sizes, such as are found on the different makes of automobiles.

Another object of the invention is to provide a tool as described of the plier type, the ends of the handles of which are adapted to be held together by a removable loop of the invention.

A further object of the invention is to provide a plier type tool as described, a head of one of the handles of which is bifurcated for disposal around a link friction pin for compressing the spring thereof.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
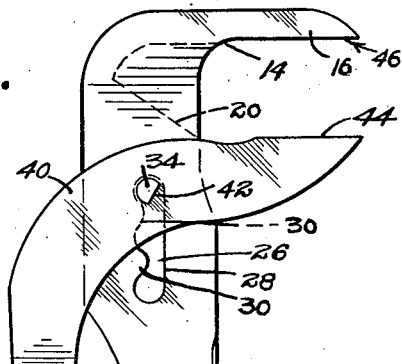
Figure 1 is a side elevation of the link friction tool of this invention; an open position of one of the lever handles thereof being shown in dotted lines; and an end ring or loop of the invention being shown in a position of non-use in dotted lines.
Figure 1:
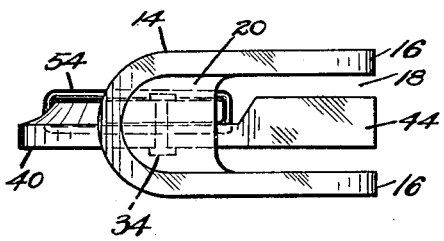
Figure 2:
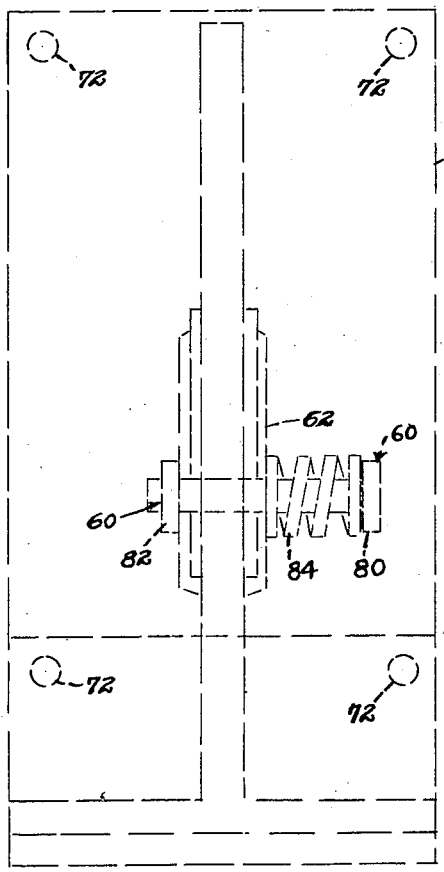
Figure 2 is a top plan view of the tool of Figure 1.

The link friction pin tool of this invention is provided with lever handles 10 and 12. The handle 10 is elongated and is provided at its head end with two outwardly extending fingers 16, the latter being disposed in spaced apart parallelism with each other and at a right angle to the remainder of the lever 10. In other words, the head end of the lever 10 is bifurcated for providing an opening 18 between the arms 16 for receiving a link section 10 later described.

The head end of the lever or handle 10 is further provided with a recessed portion or cavity 20 extending inwardly from the outer end of the head and between the arm portions or fingers 16 and on the opposite side of the head of the lever 10 from the opening 18.

The handle portion 10 is also provided with a slot 26 therein and extending longitudinally thereof. The elongated slot 26 is provided with a flat wall 28 on the front side thereof and bumps 30 on the rearward wall thereof. The bumps 30 are for the reception of a pivot pin 34 which latter is disposed through the arcuate head end 40 of the lever 12.

The pivot pin 34 is preferably non-rotatable with respect to the lever 12 and is provided with a flat side surface 42 for the purpose of permitting its movement past the bumps 30 only at times when the handle 12 is in a closed position or other non-use position. The distance between the surfaces 44 and 46 of the handle heads, at times when they are parallel, is thus made adjustable.

The head end 40 of the lever 12 is curved in an arc extending forwardly from the straight lower portion thereof. The head 40 of the lever 12 is disposed with a portion providing a jaw at a right angle to the main body portion of the lever 12 and extending forwardly therefrom. The arcuate head 40 or jaw of the lever is offset in relation to the lever, and is provided with its clamping face 44 disposed at a right angle to the main body portion 12 and disposed opposite and between the faces 46 of the end arms 16 of the head 14.

At its lower end the lever arm 10 is provided with an elongated holder 50 disposed spaced apart from the front side of the lever handle 10 and secured thereto. A ring or loop 54 is disposed extending through the space between the member 50 and the handle 10. The loop 54 is of a size and length for extending around the handle 10 and also around the rearward side of the handle 12 for securing the lower ends of the handles 10 and 12 together for a purpose later described.

Figure 3:
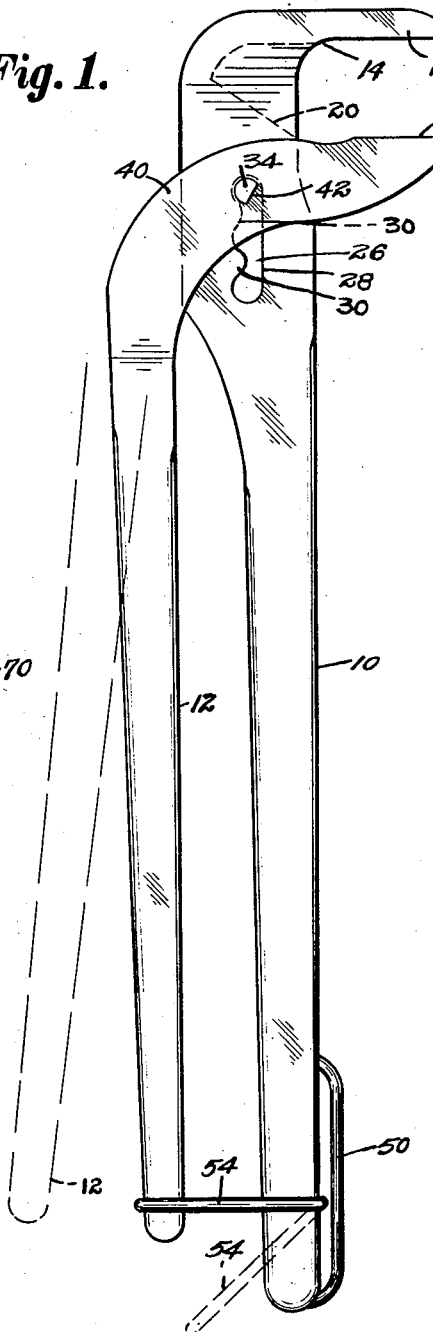
Figure 3 is a diagrammatic view of a portion of the brake drum of an automobile, the brake drum and an attached link for securing together the three ends of the brake shoes all being shown in dotted lines; a link friction pin being shown disposed through the link and having a spring thereon for maintaining the pin taut against the link.

In operation, the pliers of this invention are used for the removal of a link friction pin, as shown in dotted lines at 60 in Figure 3. The pin 60 extends through suitable apertures in a link 62, which latter is for the purpose of securing together the free ends of brake shoes, one of which is shown at 70 as attached to the link 62.

The brake shoe 70 is provided with apertures 72 therethrough as is conventional. The pin 60 is provided with a head 80 on one end and a keeper 82 on its other end. The pin 60 extends through suitable apertures in the linkage 62 and is provided with a coiled compression spring 84 disposed between the head 80 thereof and the adjacent surface of the linkage 62.

In the removal of the pin 60 the pliers are disposed for receiving the shank of the pin 60 between the arms 16 of the bifurcated head 14 thereof. The arms 16 are spaced apart a width sufficiently to permit the shank of the pin 60 to pass therethrough but are spaced apart insufficiently for permitting the spring 84 to be received therethrough. This makes it possible for the spring 84 to be grasped between the arms 16 and compressed against the surfaces 46 of the arms 16 at a time when the surface 44 of the head 40 of the other lever arm 12 is disposed against the head of the bolt 60.

By squeezing the lever arms 10 and 12 together, the spring 84 is compressed. The loop 54 is then slipped over the end of the lever arm 12 for maintaining the spring 84 compressed and for maintaining the pliers held on the pin 84 and spring 60. The operator then has both hands free for the removal of the keeper 82 and for the convenient withdrawal of the link friction pin 60. It will be seen that the member 50 will secure the loop 54 to the handle 10 to prevent its loss, at the same time permitting the loop 54 to be swung over the end of the lever arm 10 and slipped upwardly toward the head thereof.

It will be also seen that the pivot pin 34 is adapted to be disposed in any one of three recesses formed along the back side of the slots 36 by the two bumps 30 for spacing apart the surfaces 44 and 46 desired distances for use in the removal of link friction pins of various sizes as are found in the different makes of automobiles.

From the above description it is thought to be obvious that a link friction pin plier constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

I claim:

A motor vehicle brake link friction pin removing tool comprising an elongated handle of elongated rectangular shape in cross section providing a short dimension between the sides and a long dimension between the edges thereof, said handle having its dimensions enlarged to form an offset section providing a mass of metal constituting a head at one end, a pair of spaced fingers positioned at said end of the head and extended from an edge thereof at substantially right angles thereto providing a stationary jaw, said head having a pin head receiving cavity formed therein between the fingers and extended inwardly from the edge from which the fingers extend, said handle having an elongated longitudinally disposed slot therein and said slot spaced from the end on which the fingers of the stationary jaw are carried, said slot having spaced notches in one side thereof and formed with the opposite side straight, the straight side being spaced from the edge of the handle from which the fingers extend, a movable jaw having an offset handle, the said movable jaw being connected to the handle through a flat arcuate section and positioned with the flat arcuate section against one side of the handle of the stationary jaw whereby the said movable jaw is in a plane positioned midway between the fingers of the stationary jaw and whereby the movable jaw, which is also positioned at a right angle to the handle, is positioned to coact with the fingers of the stationary jaw to engage the end of a pin straddled by the fingers of the stationary jaw, a pin having a flat side pivotally mounting the movable jaw on the handle of the stationary jaw through the said slot therein, said pin providing adjusting means for adjusting the movable jaw in relation to the stationary jaw, and a ring carried by the handle of the stationary jaw and positioned to extend over the end of the handle of the movable jaw to retain the said jaws in gripping relation.

LEO J. KOCH.

REFERENCES CITED

The following references are of record in the file of this patent:

UNITED STATES PATENTS

| Number | Name | Date |
| --- | --- | --- |
| 1,051,921 | Schlehr | Feb. 4, 1913 |
| 1,536,241 | Sroka | May 5, 1925 |
| 1,586,582 | Skoglund et al. | June 1, 1926 |
| 2,360,459 | Widoe | Oct. 17, 1944 |